(12) United States Patent
Yang (10) Patent No.: US 11,973,358 B2
(45) Date of Patent: Apr. 30, 2024

(54) INDUCTIVE ELECTRONIC IDENTIFICATION DEVICE AND POWER-SUPPLY-COMPENSATION CIRCUIT OF THE SAME

(71) Applicant: ELAN MICROELECTRONICS CORPORATION, Hsinchu (TW)

(72) Inventor: Chao-Chi Yang, Hsinchu (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 468 days.

(21) Appl. No.: 17/223,475

(22) Filed: Apr. 6, 2021

(65) Prior Publication Data

US 2021/0320508 A1    Oct. 14, 2021

(30) Foreign Application Priority Data

Apr. 9, 2020   (TW) ................................. 109111996

(51) Int. Cl.
*H02J 7/00* (2006.01)
*H02J 50/05* (2016.01)
*H02J 50/10* (2016.01)
*H02J 50/80* (2016.01)

(52) U.S. Cl.
CPC ...... *H02J 7/00041* (2020.01); *H02J 7/00043* (2020.01); *H02J 50/05* (2016.02); *H02J 50/10* (2016.02); *H02J 50/80* (2016.02)

(58) Field of Classification Search
USPC ......................................................... 320/106
See application file for complete search history.

(56) References Cited

U.S. PATENT DOCUMENTS

| | | | | |
|---|---|---|---|---|
| 2005/0213353 | A1* | 9/2005 | Lys | H05B 45/14 363/17 |
| 2013/0147279 | A1* | 6/2013 | Muratov | H02J 7/00036 307/104 |
| 2017/0133842 | A1* | 5/2017 | Freeman | H02J 7/0068 |
| 2020/0159300 | A1* | 5/2020 | Erturk | H02M 3/33515 |

* cited by examiner

*Primary Examiner* — Bryce M Aisaka
(74) *Attorney, Agent, or Firm* — patenttm.us (57) ABSTRACT

An inductive electronic identification device and a power-supply-compensation circuit of the same are provided. The power-supply-compensation circuit has a power supply unit and a compensation circuit, and connects to a load unit for supplying the load unit to operate. The compensation circuit receives the compensation signal from the load unit, so that the voltage regulator of the compensation circuit controls the voltage rise and fall of one end of the capacitor of the compensation circuit. The capacitive element switches to the charging or discharging mode according to the power consumption of the load unit. In this way, electrical charges are stored when the load unit consumes less power, and compensation current is provided when the load unit consumes more power, so as to maintain the normal operation of the load unit.

20 Claims, 11 Drawing Sheets

INDUCTIVE ELECTRONIC IDENTIFICATION DEVICE AND POWER-SUPPLY-COMPENSATION CIRCUIT OF THE SAME

CROSS-REFERENCE TO RELATED APPLICATIONS

This application is based upon and claims priority under 35 U.S.C. 119 from Taiwan Patent Application No. 109111996 filed on Apr. 9, 2020, which is hereby specifically incorporated herein by this reference thereto.

BACKGROUND OF THE INVENTION

1. Field of the Invention

The present invention relates to an inductive electronic identification device, especially to a device with power-supply-compensation circuit.

2. Description of the Prior Arts

People's daily life is full of the use of many inductive electronic identification devices such as chip cards, smart cards, etc. The inductive electronic identification device has electronic recording media such as magnetic strips, barcodes, chips, etc., so that the identification device can carry more information and can be applied to more occasions. For example, the identification device can be used for identity verification, cashless payment and so on. With the population of the identification device, the phenomenon of stealing and fraudulently using other's identification devices by unscrupulous people has gradually appeared. It is also inevitable that people accidentally lose the identification device. Therefore, the verification function of the identification device itself becomes more important. In the prior art, a biometric sensor has been integrated on a conventional inductive electronic identification device to provide users with additional identity verification when using the conventional inductive electronic identification device.

When the conventional inductive electronic identification device is used, the conventional inductive electronic identification device needs power to execute the processing program. In the prior art, the way to supply the power comprises contact power supply (e.g. when the conventional inductive electronic identification device connecting to the card reader), battery power supply inside the conventional inductive electronic identification device, or contactless inductive power supply (e.g. when the conventional inductive electronic identification device proceeding contactless sensing). Especially in the case of contactless inductive power supply, in addition to not requiring a built-in battery, it also has the characteristics of fast and convenient use, so the proportion of inductive power supply used in the prior art is gradually increasing. However, the current that can be generated due to inductive power supply varies with the distance between the conventional inductive electronic identification device and the reading device. When the distance between the two is large, the current that can be generated by the induction power supply is relatively small. However, when the conventional inductive electronic identification device performs biometric identification, the required instantaneous load current is relatively large. When the aforementioned required load current is greater than the current generated by the long-distance inductive power supply, it is easy to cause the conventional inductive electronic identification device to fail to operate successfully or to perform biometric identification.

SUMMARY OF THE INVENTION

To overcome the shortcomings, the present invention solves the problem that the electronic identification device cannot operate smoothly due to the instantaneous load exceeding the supply current in the prior art. To achieve the objectives, the present invention provides a power-supply-compensation circuit of an inductive electronic identification device. The power-supply-compensation circuit electrically connects to a load unit for the operation of the load unit and has a power supply unit electrically connecting to the load unit and a compensation circuit electrically connecting to the power supply unit. The compensation circuit has a first capacitor and a first voltage regulator. The first capacitor has a first end and a second end. The first end of the first capacitor electrically connects to the power supply unit and the load unit. The first voltage regulator electrically connects to the second end of the first capacitor to adjust a voltage of the second end of the first capacitor. The first voltage regulator electrically connects to the load unit to receive a compensation signal from the load unit and adjusts the voltage of the second end of the first capacitor according to the compensation signal.

In another aspect, the present invention also provides an inductive electronic identification device having a body and the power-supply-compensation circuit as described. The load unit and the power-supply-compensation circuit are disposed in the body.

The advantage of the present invention is that the capacitor is controlled to be in a charging or discharging mode through a voltage regulator. When the current required by the load unit is small, the capacitor is controlled to store the excess electrical charges. When the current required by the load unit is large, the capacitor is controlled to release the electrical charges to supplement the insufficient power supply of the power supply unit and maintain the operating state of the load unit.

Other objectives, advantages and novel features of the invention will become more apparent from the following detailed description when taken in conjunction with the accompanying drawings.

DETAILED DESCRIPTION OF THE EMBODIMENTS

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios can be selectively designed and disposed and the detail component layouts may be more complicated.

Figure 1:
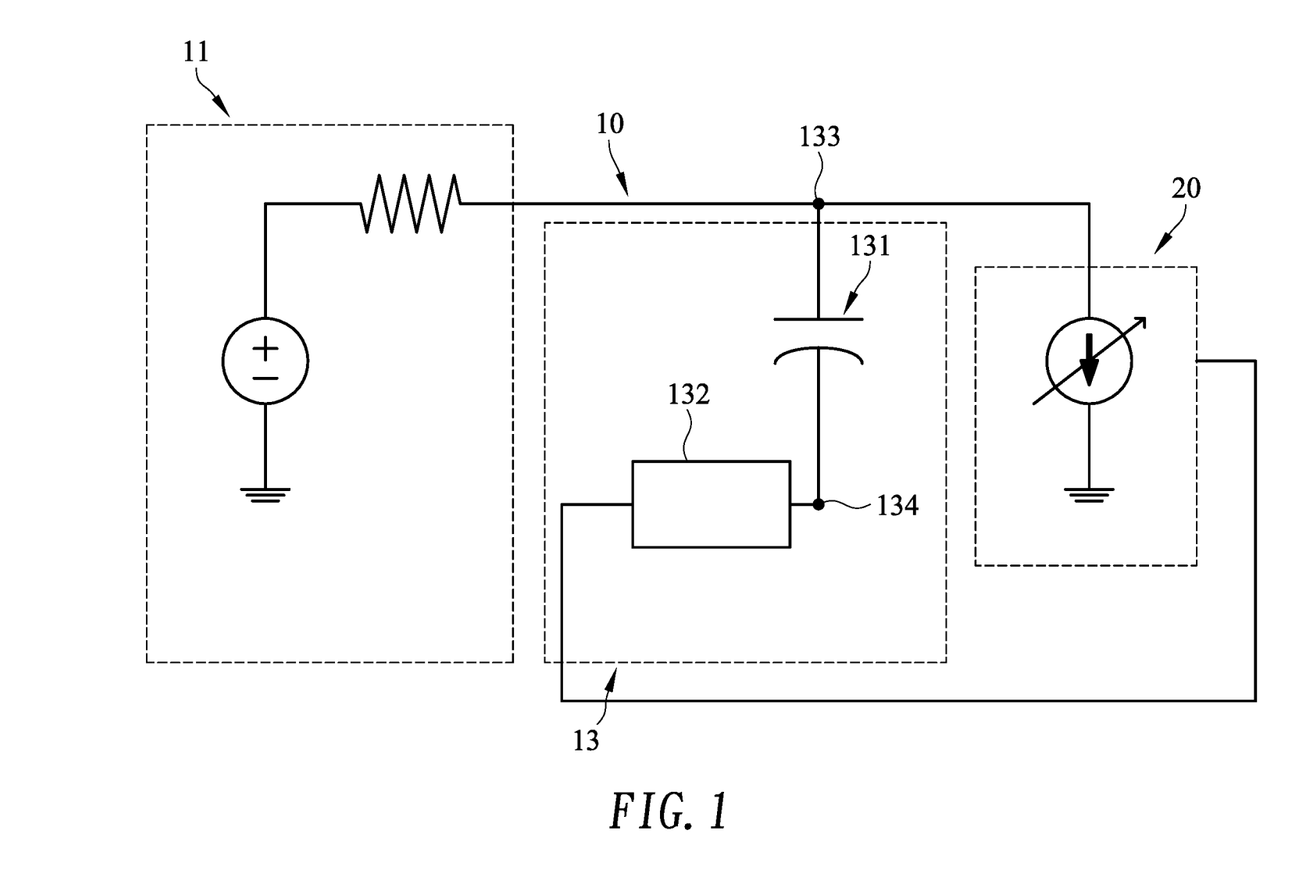
FIG. 1 is an illustrative circuit diagram of a first embodiment of a power-supply-compensation circuit in accordance with the present invention, shown connecting to a power supply unit.
Figure 2:
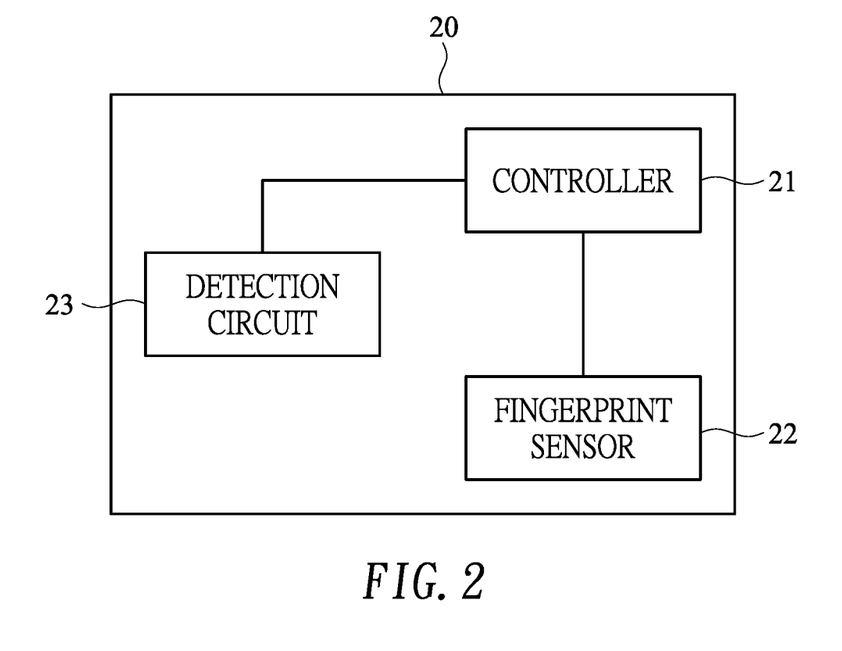
FIG. 2 is a block diagram of a load unit of the power-supply-compensation circuit in FIG. 1.

With reference to FIGS. 1 and 2, a power-supply-compensation circuit 10 of an inductive electronic identification device in accordance with the present invention comprises a power supply unit 11 and a compensation circuit 13. The power-supply-compensation circuit 10 connects to a load unit 20 to supply power to the load unit 20. The load unit 20 electrically connects to the power supply unit 11 and comprises a controller 21 and a fingerprint sensor 22. The fingerprint sensor 22 electrically connects to the controller 21 and is used to obtain fingerprint characteristic information of the user for the controller 21 to further process or determine the user's identity.

Figure 3:
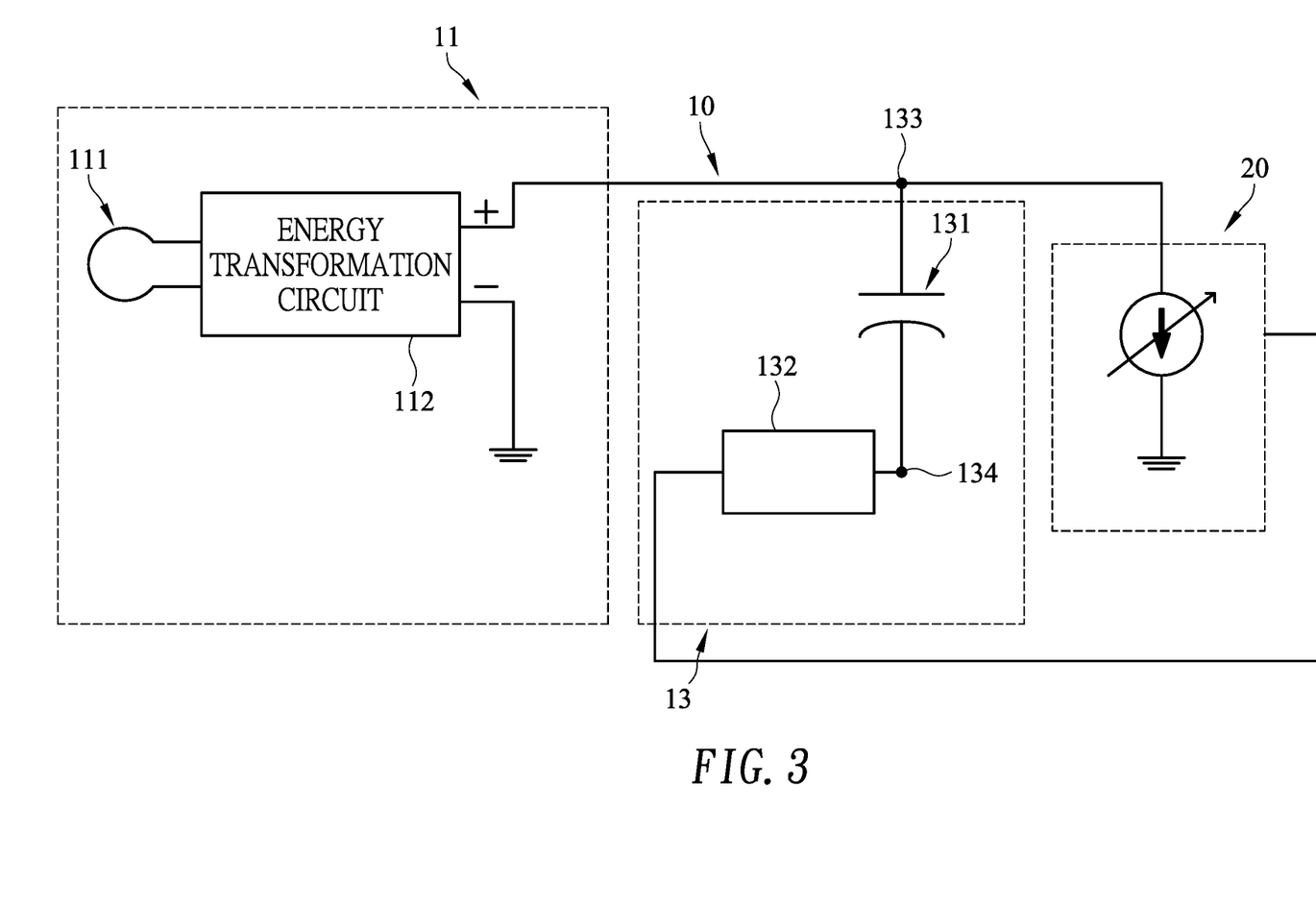
FIG. 3 is an illustrative circuit diagram of the power-supply-compensation circuit in FIG. 1, shown connecting to a certain type of the power supply unit.

The power supply unit 11 may supply power in various ways. In one embodiment as shown in FIG. 3, the power supply unit 11 comprises an induction coil 111 and an energy transformation circuit 112. The induction coil 111 electrically connects to the energy transformation circuit 112. When approaching a corresponding reading device, the induction coil 111 generates an induction current and supplies the current through the energy transformation circuit 112. Moreover, the power supply unit 11 may also be a power source such as a battery, other power supply equipment and so on.

The compensation circuit 13 electrically connects to the power supply unit 11 and is connected in parallel with the load unit 20. The compensation circuit 13 comprises at least one capacitor 131 and at least one voltage regulator 132. A first end 133 of the capacitor 131 connects respectively to the power supply unit 11 and the load unit 20. A second end 134 of the capacitor 131 is connected to the voltage regulator 132. The voltage regulator 132 adjusts a voltage of the second end 134 of the capacitor 131 according to a compensation signal output by the controller 21 of the load unit 20.

When the voltage regulator 132 adjusts the voltage of the second end 134 of the capacitor 131 to decrease with time, the electric charges are stored in the capacitor 131 so that the capacitor 131 is in a charged mode. When the voltage regulator 132 adjusts the voltage of the second end 134 of the capacitor 131 to increase with time, the electric charges stored in the capacitor 131 are released so that the capacitor 131 is in a discharged mode.

Figure 4:
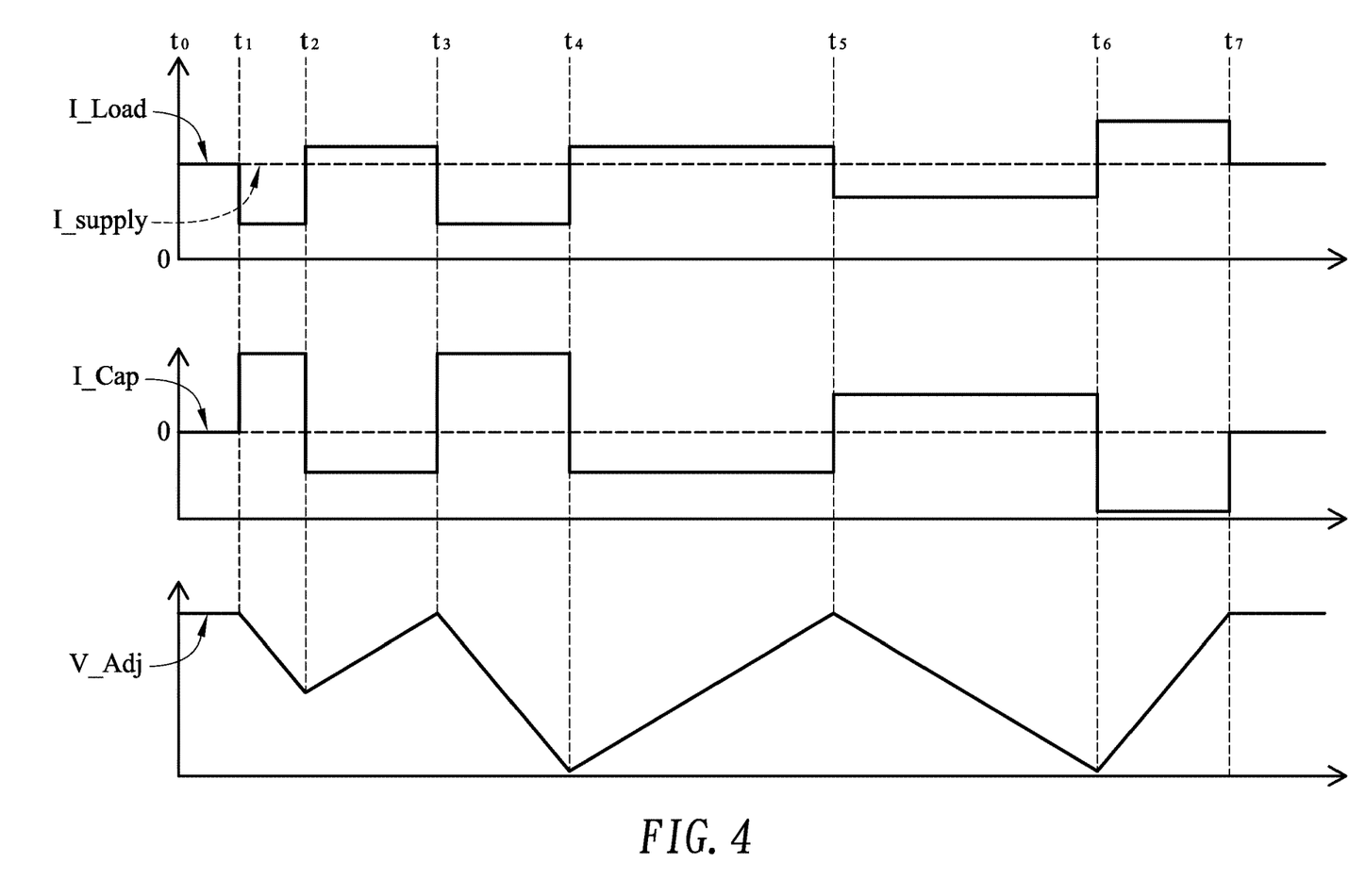
FIG. 4 is a comparative diagram of the current and voltage when the load unit and the power-supply-compensation circuit in FIG. 1 is used.
Figure 5:
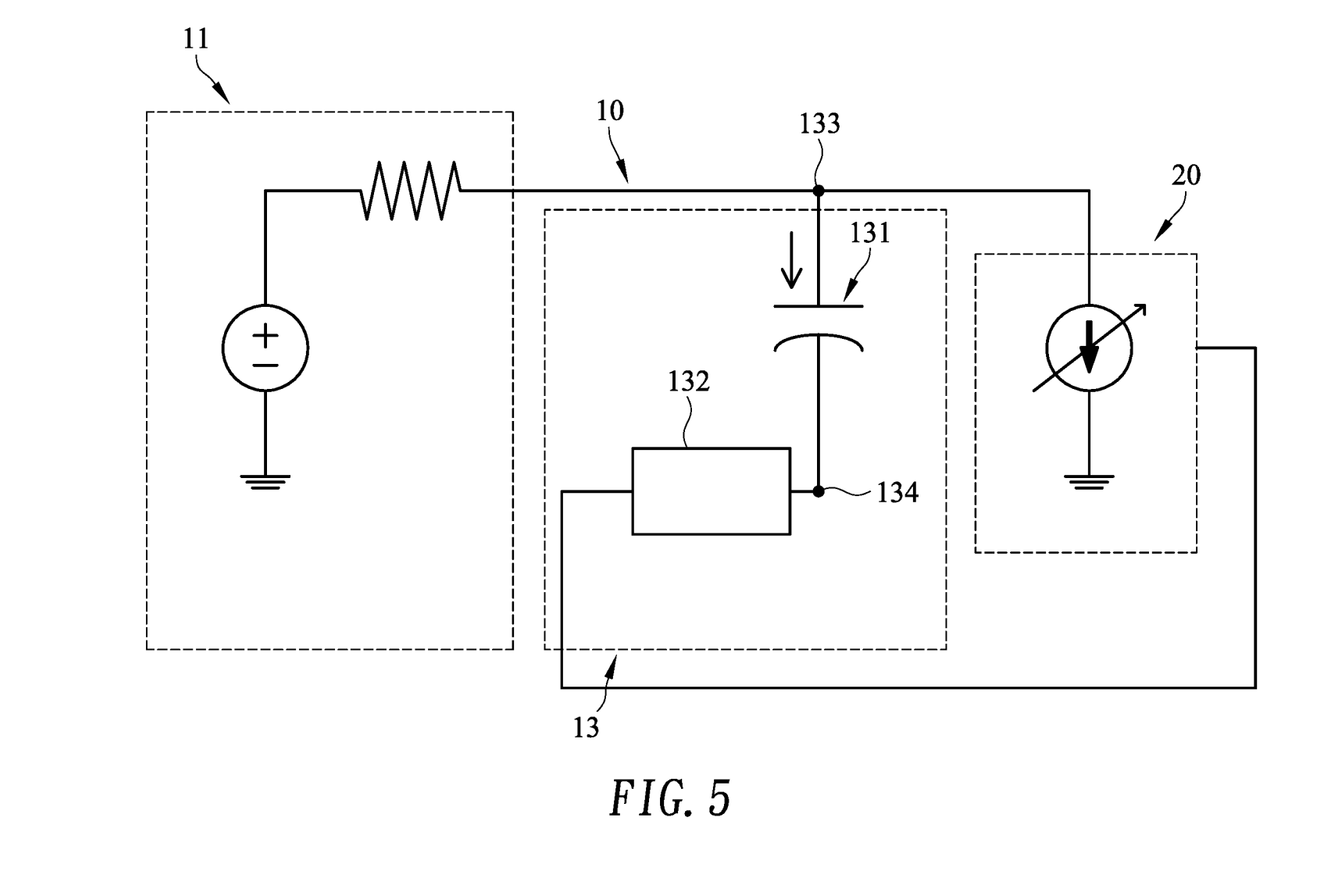
FIG. 5 is an operational illustrative circuit diagram of the power-supply-compensation circuit in FIG. 1, showing that the power-supply-compensation circuit is charged.
Figure 6:
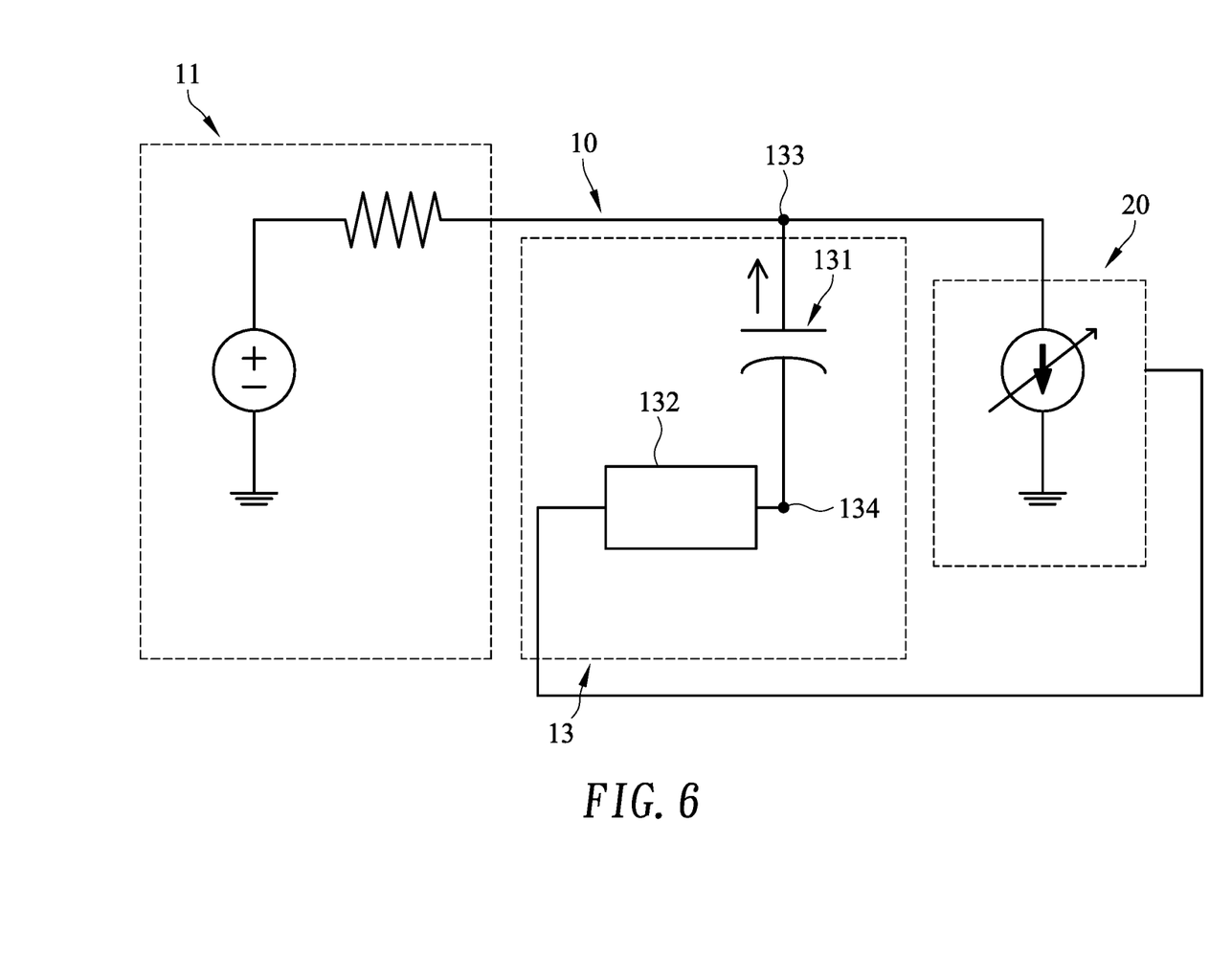
FIG. 6 is an operational illustrative circuit diagram of the power-supply-compensation circuit in FIG. 1, showing that the power-supply-compensation circuit is discharged.

In particular, with reference to FIG. 4, the amount of current required during the operation time $t_0$ to $t_7$ of the load unit 20 is assumed as the broken line of I_Load. The amount of current provided by the power supply unit 11 from the operation time $t_0$ to $t_7$ is shown by the dotted line of I_supply. The amount of current obtained or released by the capacitor 131 from the operation time $t_0$ to $t_7$ is shown by the broken line of I_Cap. The voltage regulator 132 adjusting the voltage change of the second end 134 of the capacitor 131 from the operation time $t_0$ to $t_7$ is shown by the broken line of V_Adj. With reference to FIGS. 4 and 5, the loading unit 20 is operated during the operation time $t_1$ to $t_2$, $t_3$ to $t_4$ and $t_5$ to $t_6$. The amount of current I_Load required by the load unit 20 is less than the amount of current I_supply that the power supply unit 11 can provide. At this time, the voltage V_Adj of the second end 134 of the capacitor 131 is adjusted to be decreased, so that the capacitor 131 is charged. With reference to FIGS. 4 and 6, the loading unit 20 is operated during the operation time $t_2$ to $t_3$ and $t_4$ to $t_5$. The amount of current I_Load required by the load unit 20 is larger than the amount of current I_supply that the power supply unit 11 can provide. At this time, the voltage V_Adj of the second end 134 of the capacitor 131 is adjusted to be increased, so that the capacitor 131 is discharged to supply power to the load unit 20 for maintaining the operation of the load unit 20.

The voltage regulator 132 is based on the compensation signal from the controller 21 to alter between the charge mode and the discharge mode. Therefore, the capacitor 131 is charged to store electrical charges when the current required by the load unit 20 is smaller. The capacitor 131 is discharged to release electrical charges when the current required by the load unit 20 is larger. Then the power supply unit 11 maintains the load unit 20 to operate normally.

In one embodiment, the operation procedure of the load unit 20 is usually preset. This means that when the load unit 20 starts to operate, the controller 21 knows the amount of current required for each time segment. The compensation signals output by the controller 21 are preset signals. According to the known amount of current required, the voltage regulator 132 is notified how to adjust the voltage of the second end 134 of the capacitor 131 when the capacitor 131 is charged or discharged.

In one embodiment as shown in FIG. 2, the load unit 20 may have a detection circuit 23. The detection circuit 23 detects the overall load current of the load unit 20 and informs the controller 21 as a feedback. The controller 21 determines the compensation signal according to the feedback of the overall load current to inform the voltage regulator 132 how to adjust the voltage of the second end 134 of the capacitor 131, and then dynamically and instantly control when the capacitor 131 is charged or discharged.

The compensation circuit 13 may be implemented in various embodiment. Several of the embodiments are shown as following but the compensation circuit 13 is not limited thereto.

In one embodiment as shown in FIG. 1, the compensation circuit 13 comprises a capacitor 131 and a voltage regulator 132. The single voltage regulator 132 is used to adjust the voltage of the second end 134 of the capacitor 131.

Figure 7:
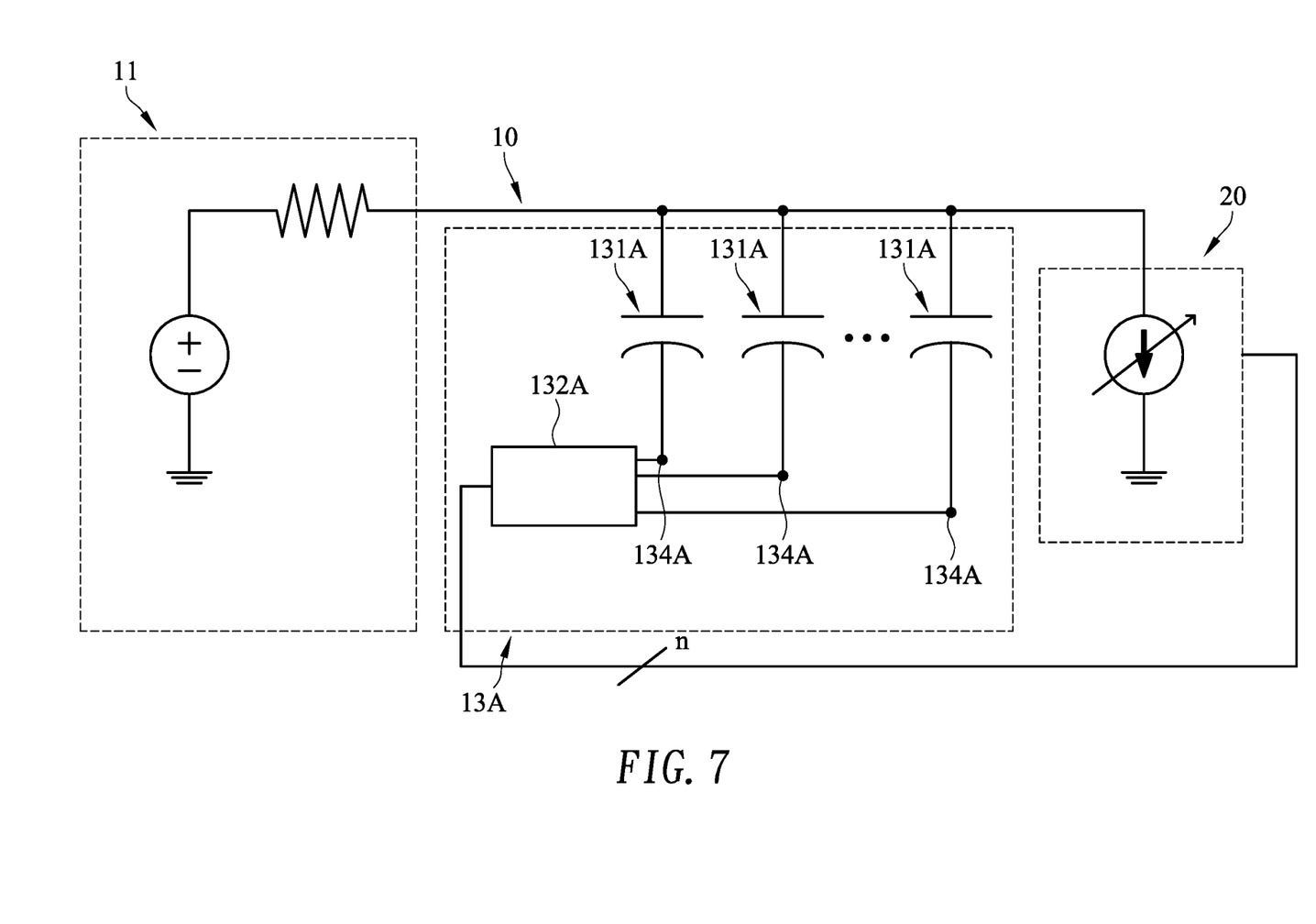
FIG. 7 is an illustrative circuit diagram of a second embodiment of a power-supply-compensation circuit in accordance with the present invention, shown connecting to a power supply unit.

In one embodiment as shown in FIG. 7, the compensation circuit 13A comprises multiple capacitors 131A and a voltage regulator 132A. The multiple capacitors 131A includes a first capacitor 131A and a second capacitor 131A. The voltage regulator 132A connects to the second ends 134A of the capacitors 131A. The single voltage regulator 132A is used to adjust the voltages of the second ends 134A of the capacitors 131A individually or collectively.

Figure 8:
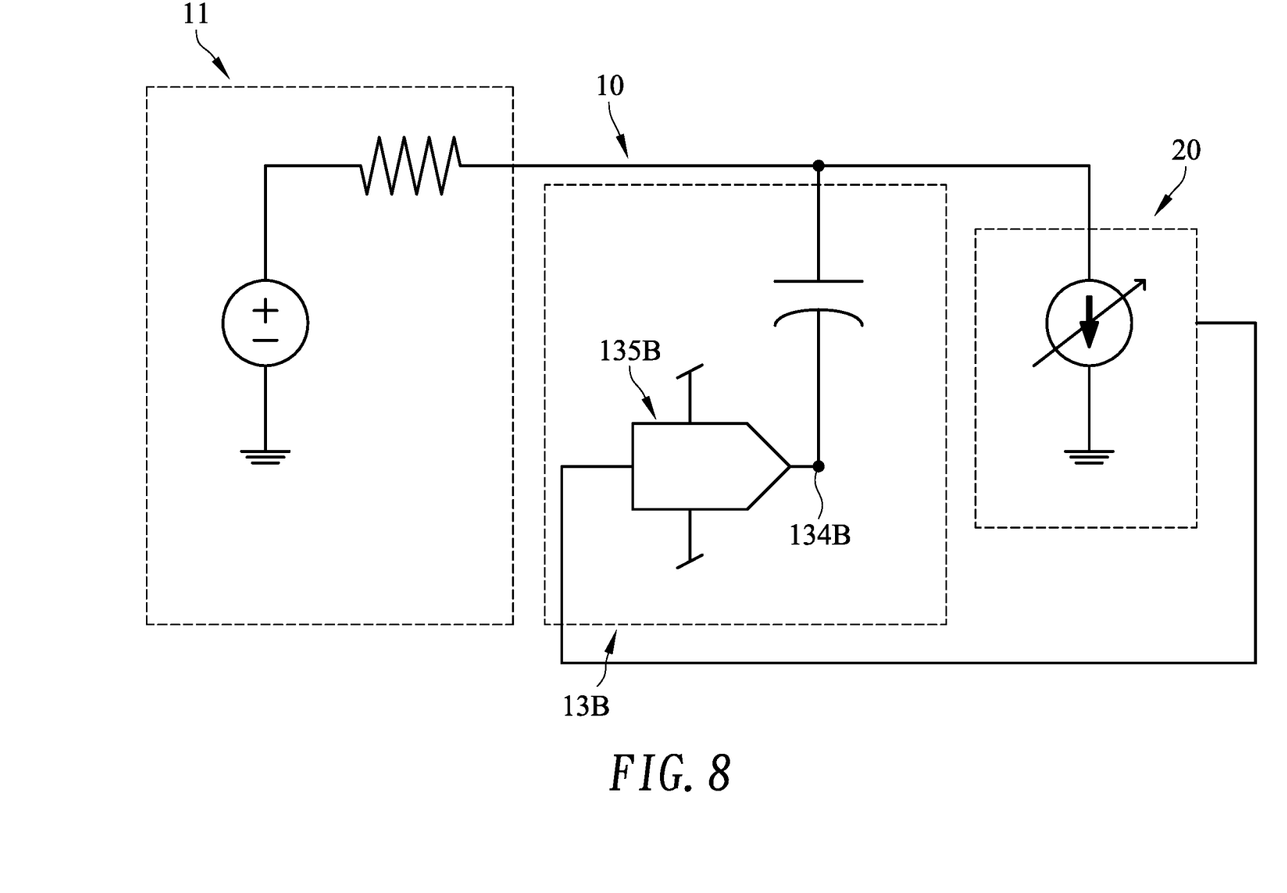
FIG. 8 is an illustrative circuit diagram of a third embodiment of a power-supply-compensation circuit in accordance with the present invention, shown connecting to a power supply unit.

In one embodiment as shown in FIG. 8, the compensation circuit 13B is similar to the compensation circuit 13 as shown in FIG. 1. The difference is that the compensation circuit 13B has a digital-to-analog converter (DAC) 135B as the voltage regulator. The DAC 135B adjusts the voltage of the second end 134B of the capacitor 131B according to the compensation signal from the controller 21. The DAC 135B adjusts the voltage to a multi-stage potential change, so that the compensation circuit 13B has a variety of flexible choices in the selection of the charge and discharge potentials.

Figure 9:
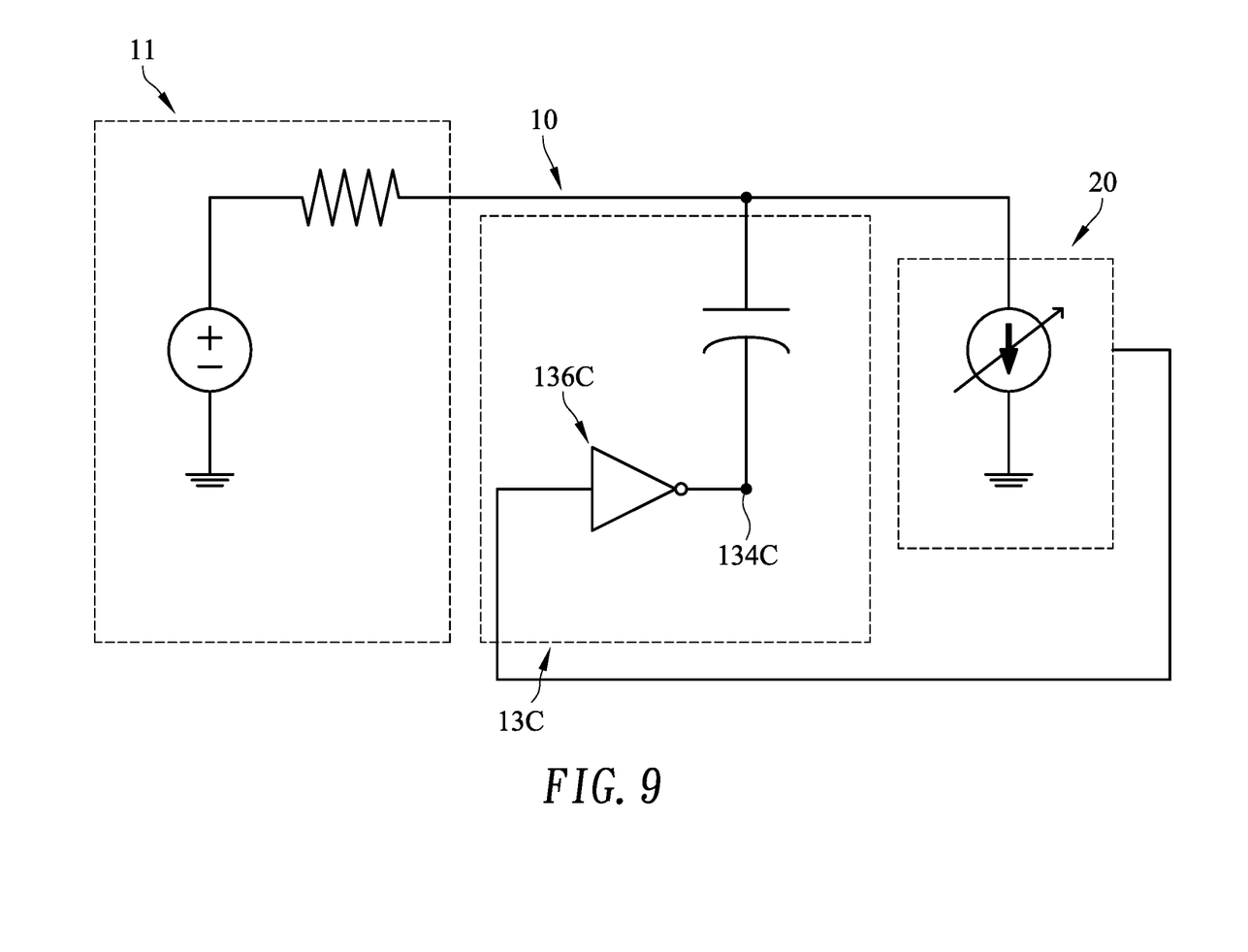
FIG. 9 is an illustrative circuit diagram of a fourth embodiment of a power-supply-compensation circuit in accordance with the present invention, shown connecting to a power supply unit.

In one embodiment as shown in FIG. 9, the compensation circuit 13C is similar to the compensation circuit 13 as shown in FIG. 1. The difference is that the compensation circuit 13C has an inverter 136C as the voltage regulator. The inverter 136C adjusts the voltage of the second end 134C of the capacitor 131C according to the compensation signal from the controller 21. The inverter 136C may adjust the voltage as a high potential or a low potential.

Figure 10:
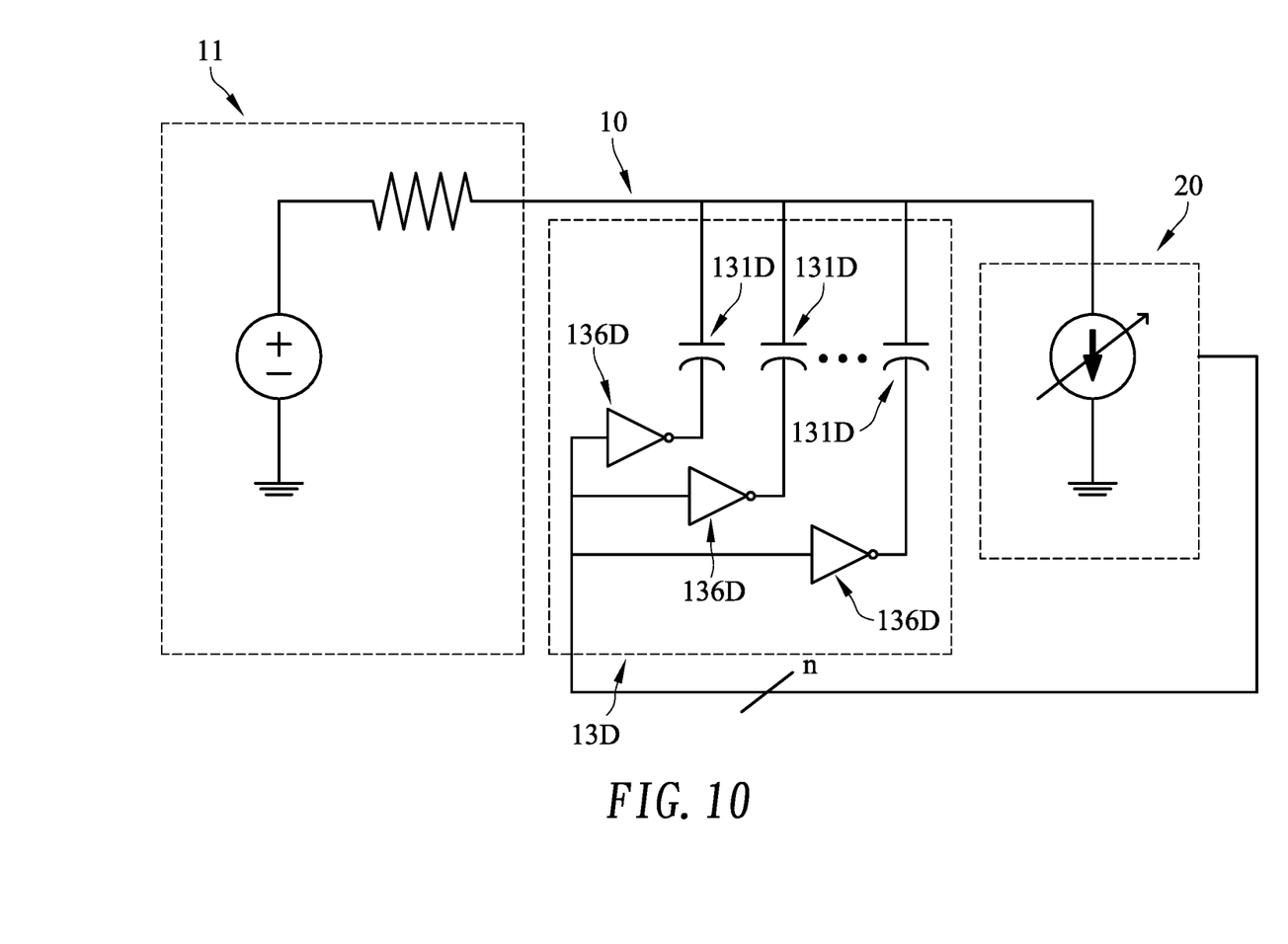
FIG. 10 is an illustrative circuit diagram of a fifth embodiment of a power-supply-compensation circuit in accordance with the present invention, shown connecting to a power supply unit.

In one embodiment as shown in FIG. 10, the compensation circuit 13D is similar to the compensation circuit 13C as shown in FIG. 9. The difference is that the compensation circuit 13D has multiple inverters 136D and multiple capacitors 131D. The inverters 136D are used as a first voltage regulator and a second voltage regulator. Each inverter 136D connects to one of the capacitors 131D. Each capacitor 131D connects to one of the inverters 136D. The inverters 136D adjust the voltages of the second ends 134D of the capacitors 131D according to the compensation signal from the controller 21. The inverters 136D may adjust the voltages as a high potential or a low potential. In practical applications, the high or low potential adjusted by each inverter 136D may be different so that different amounts of the capacitors 131D may be controlled in charging or discharging mode. Then a variety of flexible options for the selection of charge and discharge potentials may be provided, so as to adjust the amount of electrical charges stored or released to show different changes.

Figure 11:
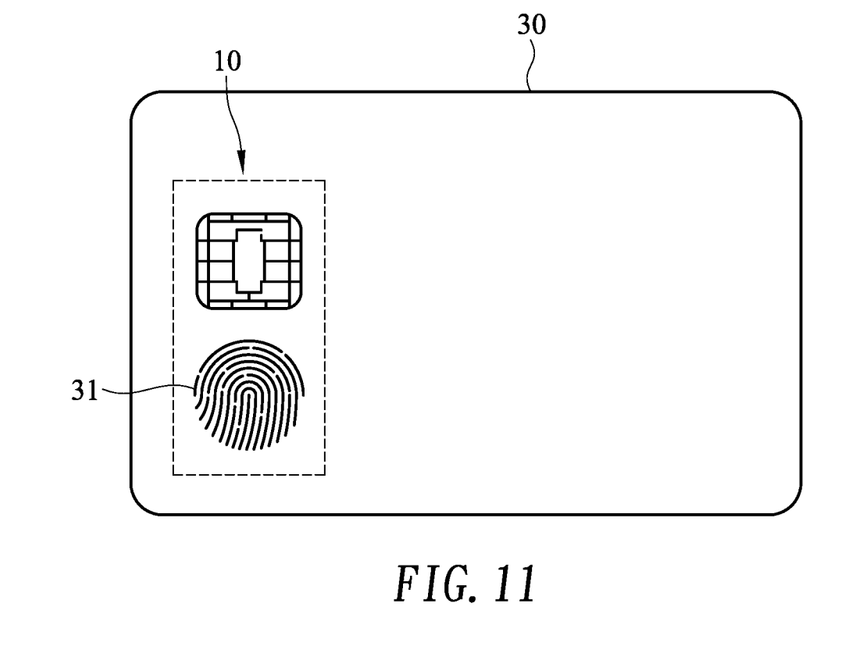
FIG. 11 is a plan view of an inductive electronic identification device in accordance with the present invention.

With reference to FIG. 11, an inductive electronic identification device in accordance with the present invention comprises the power-supply-compensation circuit 10 as described, a load unit 20 and a body 30. The power-supply-compensation circuit 10 and the load unit 20 are disposed in the body 30. In one embodiment, a surface of the body 30 has a indication area 31 to mark the position of the fingerprint sensor so that the user may perform fingerprint recognition easily.

In one embodiment, the inductive electronic identification device is a smart card. When the user brings the smart card close to the corresponding reading device, the smart card activates its fingerprint recognition function and the load unit 20 starts to operate. The induction coil 111 of the power-supply-compensation circuit 10 also generates induction power supply. In the process, the load unit 20 outputs a compensation signal according to the preset work flow or the feedback of the aforementioned detection circuit 23. The voltage regulator 132 adjusts the voltage of the second end 134 of the capacitor 131 according to the compensation signal, and then controls the capacitor 131 to be in a charging or discharging mode, so as to maintain the operating state of the load unit 20. Furthermore, the compensation circuit 13 provides a compensation current when the current provided by the power supply unit 11 is less than the current required by the load unit 20. Even if the distance between the smart card and the reading device is large and the induced current generated by the power supply unit 11 is small, the operating state of the load unit 20 is still maintained by the compensation current provided by the compensation circuit 13. Therefore, the working distance between the inductive electronic identification device and the reading device is effectively increased.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A power-supply-compensation circuit of an inductive electronic identification device electrically connecting to a load unit for the operation of the load unit, wherein the power-supply-compensation circuit comprises:
   a power supply unit electrically connecting to the load unit; and
   a compensation circuit electrically connecting to the power supply unit and comprising a first capacitor and a first voltage regulator, the first capacitor having a first end and a second end, the first end of the first capacitor electrically connecting to the power supply unit and the load unit, the first voltage regulator electrically connecting to the second end of the first capacitor to adjust a voltage of the second end of the first capacitor, wherein
   the first voltage regulator electrically connects to the load unit to receive a compensation signal from the load unit and adjusts the voltage of the second end of the first capacitor to control the first capacitor being charged or discharged according to the compensation signal.

2. The power-supply-compensation circuit as claimed in claim 1, wherein the first voltage regulator is a digital-to-analog convertor or an inverter.

3. The power-supply-compensation circuit as claimed in claim 1, wherein the compensation circuit further comprises a second capacitor having a first end and a second end; and the first voltage regulator electrically connects respectively to the second end of the first capacitor and the second end of the second capacitor.

4. The power-supply-compensation circuit as claimed in claim 3, wherein the first voltage regulator is a digital-to-analog convertor or an inverter.

5. The power-supply-compensation circuit as claimed in claim 1, wherein the compensation circuit further includes a second capacitor having a first end and a second end; and a second voltage regulator electrically the second end of the second capacitor.

6. The power-supply-compensation circuit as claimed in claim 5, wherein the first voltage regulator and the second voltage regulator are digital-to-analog convertors or inverters.

7. An inductive electronic identification device comprising:
- a body;
- a load unit disposed in the body and having a controller;
- a power-supply-compensation circuit disposed in the body and having
  - a power supply unit electrically connecting to the load unit; and
  - a compensation circuit electrically connecting to the power supply unit and having a first capacitor and a second voltage regulator, the first capacitor having a first end and a second end, the first end of the first capacitor electrically connecting to the power supply unit and the load unit, the first voltage regulator electrically connecting to the second end of the first capacitor to adjust a voltage of the second end of the first capacitor, wherein
- the first voltage regulator electrically connects to the controller of the load unit to receive a compensation signal and adjusts the voltage of the second end of the first capacitor to control the first capacitor being charged or discharged according to the compensation signal.

8. The inductive electronic identification device as claimed in claim 7, wherein the first voltage regulator is a digital-to-analog convertor or an inverter.

9. The inductive electronic identification device as claimed in claim 7, wherein the compensation circuit further comprises a second capacitor having a first end and a second end, the first voltage regulator electrically connects respectively to the second end of the first capacitor and the second end of the second capacitor.

10. The inductive electronic identification device as claimed in claim 9, wherein the first voltage regulator is a digital-to-analog convertor or an inverter.

11. The inductive electronic identification device as claimed in claim 9, wherein the load unit comprises a fingerprint sensor electrically connecting to the controller.

12. The inductive electronic identification device as claimed in claim 9, wherein the compensation signal output by the controller is determined based on a current known in advance by the controller that the load unit needs in each time segment.

13. The inductive electronic identification device as claimed in claim 9, wherein the compensation signal output by the controller is determined based on detecting a load current of the load unit.

14. The inductive electronic identification device as claimed in claim 7, wherein the compensation circuit further includes a second capacitor having a first end and a second end; and a second voltage regulator electrically the second end of the second capacitor.

15. The inductive electronic identification device as claimed in claim 14, wherein the load unit comprises a fingerprint sensor electrically connecting to the controller.

16. The inductive electronic identification device as claimed in claim 14, wherein the compensation signal output by the controller is determined based on a current known in advance by the controller that the load unit needs in each time segment.

17. The inductive electronic identification device as claimed in claim 14, wherein the compensation signal output by the controller is determined based on detecting a load current of the load unit.

18. The inductive electronic identification device as claimed in claim 7, wherein the load unit comprises a fingerprint sensor electrically connecting to the controller.

19. The inductive electronic identification device as claimed in claim 7, wherein the compensation signal output by the controller is determined based on a current known in advance by the controller that the load unit needs in each time segment.

20. The inductive electronic identification device as claimed in claim 7, wherein the compensation signal output by the controller is determined based on detecting a load current of the load unit.

\* \* \* \* \*